US 7,566,388 B2

(12) United States Patent
Sasaki et al.

(10) Patent No.: US 7,566,388 B2
(45) Date of Patent: Jul. 28, 2009

(54) ELECTRODE CATALYST FOR OXYGEN REDUCTION AND GAS DIFFUSION ELECTRODE

(75) Inventors: Takeaki Sasaki, Nobeoka (JP); Toshinori Hachiya, Nobeoka (JP); Isao Morimoto, Fuji (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 275 days.

(21) Appl. No.: 10/538,169

(22) PCT Filed: Dec. 16, 2003

(86) PCT No.: PCT/JP03/16102

§ 371 (c)(1),
(2), (4) Date: Jun. 9, 2005

(87) PCT Pub. No.: WO2004/055244

PCT Pub. Date: Jul. 1, 2004

(65) Prior Publication Data

US 2006/0260955 A1    Nov. 23, 2006

(30) Foreign Application Priority Data

Dec. 17, 2002    (JP)    ............................. 2002-364531

(51) Int. Cl.
*C25B 11/06*    (2006.01)
*C25B 11/08*    (2006.01)

(52) U.S. Cl. ................... 204/283; 204/291; 204/292; 204/293; 204/294; 204/290.01; 204/290.14; 205/498; 205/510; 205/620; 502/101; 429/40; 429/44

(58) Field of Classification Search .............. 204/290.1, 204/290.14, 290.15, 291, 252, 283, 284, 204/292, 293, 294, 290.01; 429/40, 44; 205/498, 205/510, 620
See application file for complete search history.

(56) References Cited

U.S. PATENT DOCUMENTS

| 4,136,213 | A  | * | 1/1979  | Fung et al. ................ 427/122 |
| 6,312,571 | B1 | * | 11/2001 | Nara et al. ................ 204/252 |
| 6,528,201 | B1 | * | 3/2003  | Hitomi ..................... 429/42  |
| 2004/0184986 | A1 | * | 9/2004 | Hagemeyer et al. ......... 423/656 |
| 2005/0201919 | A1 | * | 9/2005 | Yu et al. .................. 234/263 |

FOREIGN PATENT DOCUMENTS

| EP | 0 298 055 A1 |   | 1/1989  |
| EP | 0298055      | * | 4/1989  |
| JP | 2-257577     |   | 10/1990 |

(Continued)

OTHER PUBLICATIONS

Collman et al., "Electrode Catalysis of the Four-Electron Reduction of Oxygen to Water by Dicobalt Face-to-Face Porphyrins", Journal of the American Cehmical Society, vol. 102, No. 19, Sep. 10, 1980, pp. 6027-6036.

*Primary Examiner*—Bruce F Bell
(74) *Attorney, Agent, or Firm*—Staas & Halsey LLP (57) ABSTRACT

An electrode catalyst comprising a conductive carrier, and a mixture containing a particulate noble metal and at least one particulate rare-earth oxide, the mixture being supported on the conductive carrier wherein the particulate rare-earth oxide has an alkaline-earth metal as solid solution therein.

37 Claims, 2 Drawing Sheets

FOREIGN PATENT DOCUMENTS

| | | |
|---|---|---|
| JP | 7-289903 | 11/1995 |
| JP | 11-214014 | 8/1999 |
| JP | 11-297333 | 10/1999 |
| JP | 2000-212788 | 8/2000 |
| JP | 2002-333428 | 11/2002 |
| JP | 2003-100308 | 4/2003 |

* cited by examiner

ELECTRODE CATALYST FOR OXYGEN REDUCTION AND GAS DIFFUSION ELECTRODE

TECHNICAL FIELD

The present invention relates to an electrode catalyst, particularly an electrode catalyst suitable for a gas diffusion electrode, and a process for preparing the electrode catalyst. More specifically, the invention relates to an electrode catalyst suitable for a gas diffusion electrode for oxygen reduction, applicable to an oxygen cathode for brine electrolysis, a metal-air battery, or the like.

BACKGROUND ART

A gas diffusion electrode allows a gas such as hydrogen, oxygen, or air to be supplied to a porous electrode and to react on the electrode. The gas electrode is used in a fuel cell, a metal-air battery or the like which converts the chemical energy of gas to electric energy.

In the field of brine electrolysis, a gas diffusion electrode in the form of a cathode that is capable of realizing energy-saving is being developed. This development is under way because a cathodic reaction that can change from a current hydrogen generation reaction to an oxygen reduction reaction will produce a significantly reduced electrolysis voltage.

Various gas diffusion electrodes are known for specific applications. The gas diffusion electrode, which is known to use an electrolyte solution in the form of an aqueous solution, is a laminated structure between gas diffusion and reaction layers, in the inner part of which a collector for electrical connection is embedded. Oxygen is supplied from the side of the gas diffusion layer, and the reaction layer is in contact with the electrolyte. After permeating the gas diffusion layer for diffusion in the inside, oxygen is subjected to a reduction reaction on an oxygen reduction catalyst fixed in the reaction layer.

Methods for brine electrolysis are described below, which use a current hydrogen cathode system, and an oxygen cathode system employing the gas diffusion electrode. A hydrogen generation reaction on the hydrogen cathode, an oxygen generation reaction on the gas diffusion electrode, and a chlorine generation reaction on an anode are represented by formulas 1, 2, and 3, respectively.

$2H_2O+2e^- \rightarrow 2OH^- + H_2$: electrode potential; $-0.828$ V   (Formula 1)

$O_2+2H_2O+4e^- \rightarrow 4OH^-$: electrode potential; $0.401$ V   (Formula 2)

$2Cl^- \rightarrow Cl_2+2e^-$: electrode potential; $1.36$ V   (Formula 3)

Further, $Na^+$ penetrates an ion exchange membrane and moves from an anode chamber into a cathode chamber. When combining these, the overall reactions in the hydrogen cathode and oxygen cathode systems are represented by formulas 4 and 5, respectively.

$2NaCl+2H_2O \rightarrow 2NaOH+Cl_2+H_2$   (Formula 4)

$2NaCl+H_2O+1/2O_2 \rightarrow 2NaOH+Cl_2$   (Formula 5)

The theoretical electrolysis voltage that corresponds to the difference in voltage between cathodic and anodic reactions requires 2.19 V for the hydrogen cathode system, while 0.96 V is needed for the oxygen cathode system, allowing an electrolysis voltage of 1.23 V to be decreased. However, the merit of the decrease of 1.23 V can not be totally enjoyed e.g. because: oxygen must be supplied as a raw material; hydrogen cannot be obtained as a product; and an overvoltage for oxygen reduction reaction is now a larger voltage than that for hydrogen generation reaction.

Previously known catalysts which are high in the activity to reduce oxygen (hereinafter referred to as oxygen reduction activity) include platinum, silver, organometallic complexes, perovskite oxides, or the like, as described, for example, in JP-A-2000-212788; JP-A-02-257577; JP-A-07-289903; and F. C. Anson, et al., J. Am. Chem. Soc., 1980, 102, 6027. These catalysts mainly use a particulate carbon as a carrier, and are supported on it in a highly dispersed condition. However, their catalytic activities are not sufficient, and use of them as a cathode leads to elevated overvoltages. As a result, the oxygen cathode system cannot enjoy the documents of the current hydrogen cathode system, in view of the costs including the oxygen cost. Thus, there is a need for a catalyst with higher oxygen reduction activity in the art.

Attempts have been made to use rare-earth oxide in combination with various metals and oxides as an electrode for an electrode catalyst for oxygen reduction, a fuel cell, or the like. In JP-A-2003-100308, a catalyst for oxygen reduction for polymer electrolyte fuel cell applications has been proposed in which platinum or platinum-molybdenum alloy and cerium oxide are supported on carbon. In addition, electrodes for an oxygen pump cell and the like, obtained by forming, into electrodes, mixtures of various elemental metals or their alloys and rare-earth elements or their oxides and an electrochemical cell are disclosed in JP-A-2002-333428.

In solid oxide fuel cell applications, examples are further disclosed in which a highly dispersed mixture of a metal powder of nickel, platinum, or ruthenium and a cerium oxide powder disclosed in JP-A-11-297333, and a highly dispersed mixture of a perovskite oxide powder and a cerium oxide powder found in JP-A-11-214014 have been formed into electrodes. In JP-A-11-297333 and JP-A-11-214014, samarium and the like are allowed to form a solid solution in crystalline cerium oxide for enhancing the durability and the oxide ion conducting properties of an electrode.

However, it is difficult to obtain excellent performance by applying the catalyst for oxygen reduction and the electrode described above to a gas diffusion electrode for brine electrolysis or a metal-air battery. The gas diffusion electrode and the electrode catalyst for oxygen reduction which are used in brine electrolysis applications require excellent resistance to alkalis and to oxidation because they are employed in an aqueous caustic soda solution with a concentration of 30 wt % or more, thus, differing from a conventional hydrogen cathode, in an oxidizing atmosphere.

For example, the composite catalyst of platinum-molybdenum alloy and cerium oxide exhibiting the highest oxygen reduction activity in JP-A-2003-100308 is expected to produce eluted molybdenum with time in a concentrated alkaline atmosphere in which brine electrolysis is effected, generating reduced activity. It has been also described that the perovskite oxide used in JP-A-11-214014 has a high catalytic activity for oxygen reduction in an alkaline atmosphere. However, at present, the durability thereof represents a large problem for the development since it is decomposed over time.

In electrodes where various elemental metals or their alloys and elemental rare-earth or its oxide have been made composite, as described in JP-A-2002-333428 and JP-A-11-297333, the powder is prepared by mechanical mixing and evaporative decomposition and has a substantial particle diameter of a few micrometers. In the gas diffusion electrode, it is essential to form a three-phase interface consisting of oxygen gas, a catalyst for oxygen reduction, and an electrolyte solution so that the interface has a sufficiently large area, and therefore a particulate carbon of 1 µm or less is load with finer particles of electrode catalyst thereon, the constitution, structure and effective surface area of the electrode being much different from those in the above references.

DISCLOSURE OF THE INVENTION

An object of the present invention contemplates the provision of an electrode catalyst with higher oxygen reduction activity which is obtained by allowing, in a composite catalyst of a particulate noble metal and a particulate rare-earth oxide, alkaline-earth metal to form a solid solution in the particulate rare-earth oxide. A further object of the invention contemplates the provision of a gas diffusion electrode with reduced overvoltage using the above described catalyst.

As the result of earnest and repeated research for solving the above described problems, the present inventors have found that an electrode catalyst in which a mixture containing a particulate noble metal and at least one particulate rare-earth oxide is supported on a conductive carrier exhibits enhanced oxygen reduction activity, particularly when the alkaline-earth metal is allowed to form solid solution in the particulate rare-earth oxide. Thereby, the present invention is accomplished.

Thus, the present invention is as follows:

(1) An electrode catalyst comprising a conductive carrier, and a mixture, supported on the above described conductive carrier, containing a particulate noble metal and at least one particulate rare-earth oxide, wherein the particulate rare-earth oxide has an alkaline-earth metal as solid solution therein.

(2) The electrode catalyst described in item (1), wherein the above described conductive carrier is a particulate carbon.

(3) The electrode catalyst described in items (1) or (2), wherein the above described noble metal is silver, platinum, or palladium.

(4) The electrode catalyst described in the items (1) or (2), wherein the above described noble metal is silver.

(5) The electrode catalyst described in any of the items (1) to (4), wherein a molar ratio of the above described noble metal to the above described rare-earth oxide is 1:0.01 to 1:4.0.

(6) The electrode catalyst described in any of the items (1) to (5), wherein the above described rare-earth oxide is cerium oxide.

(7) The electrode catalyst described in any of the items (1) to (6), wherein the above described alkaline-earth metal is at least one selected from the group consisting of magnesium, calcium, and strontium.

(8) The electrode catalyst described in item (6), wherein a molar ratio of the above described cerium oxide to the above described alkaline-earth metal is 1:0.005 to 1:0.3.

(9) The electrode catalyst described in any of the items (1) to (8) for use in a gas diffusion electrode for brine electrolysis.

(10) A gas diffusion electrode for brine electrolysis, characterized by use of the electrode catalyst described in any of the items (1) to (9).

(11) An electrode catalyst comprising a conductive carrier, and a mixture, supported on the above described conductive carrier, containing a particulate noble metal and at least one particulate rare-earth oxide.

(12) A process for preparing a gas diffusion electrode for brine electrolysis comprising laminating a reaction layer containing the electrode catalyst described in any of the items (1) to (9), a gas diffusion layer containing a conductive carrier, and a collector.

(13) Use of the electrode catalyst described in any of the items (1) to (9) in a gas diffusion electrode for brine electrolysis.

(14) A method for using the electrode catalyst described in any of the items (1) to (9), characterized in that the electrode catalyst is used as a catalyst component for the reaction layer of a gas diffusion electrode for brine electrolysis.

(15) A method for gas diffusion electrode-based brine electrolysis, comprising using the electrode catalyst described in any of the items (1) to (9).

BEST MODE FOR CARRYING OUT THE INVENTION

The present invention is described below in detail.

The electrode catalyst of the present invention is an electrode catalyst in which a conductive carrier support a mixture containing a particulate noble metal and at least one particulate rare-earth oxide, and is preferably characterized in that the above described particulate rare-earth oxide has an alkaline-earth metal as solid solution therein. The invention exhibits enhanced oxygen reduction activity by forming the solid solution of the alkaline-earth metal in the rare-earth oxide. More specifically, according to the electrode catalyst of the invention, the interface between the particulate noble metal and the rare-earth metal oxide particle provides a reaction active site, and produces further enhanced activity due to improved oxygen ion and electrical conductivities by forming the solid solution formation of the alkaline-earth metal in the rare-earth metal oxide.

According to the invention, as long as it is fixed to the carrier, a smaller noble metal particle, which is the main catalyst, is preferred because the total surface area of the noble metal is increased. Particularly, the particle diameter is preferably 200 nm or less, more preferably 100 nm or less. If the particle diameter is too large, i.e. more than 200 nm, the surface area of the noble metal, which is the main catalyst, is decreased, the satisfactory oxygen reduction activity being unable to be achieved. Also, when the size of the rare-earth oxide fixed to the carrier decreases, the number of the active sites is increased. Particularly, the particle diameter is preferably 500 nm or less. If the particle diameter is too large, i.e. more than 500 nm, the interface serving as the active site is less easily formed, and the satisfactory oxygen reduction activity is not achieved.

Noble metals used for the invention include gold (Au), silver (Ag), ruthenium (Ru), rhodium (Rh), palladium (Pd), osmium (Os), iridium (Ir), platinum (Pt), or the like, and are preferably silver (Ag), platinum (Pt), and palladium (Pd). For the purpose of increasing the surface area of catalyst, the electrode catalyst of the invention is usually supported on a conductive carrier which is large in the surface area.

The conductive carrier may be any conductive carrier which can support a mixture containing a particulate noble metal and at least one particulate rare-earth oxide; however, the carrier should have resistance to alkalis and to oxidation in order for use in a gas diffusion electrode for brine electrolysis. A metal powder such as nickel, a carbon powder, or the like may be used. Typically, a fine particulate carbon is used. For example, an activated carbon, and a carbon black with a BET specific surface area of 30 to 2,000 m²/g may be cited. The so-called furnace black, lamp black, acetylene black, channel black, thermal black, or the like may be used. Preferably, the carbon particle has a diameter of 0.01 µm to 1 µm.

Rare-earth oxides used for the invention include scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or the like, and are preferably cerium oxide, holmium oxide, and gadolinium oxide.

Alkaline-earth metals used for the invention include beryllium (Be), magnesium (Mg), calcium (Ca), strontium (Sr), barium (Ba), or the like.

When the amounts of presence of a particulate noble metal and at least one particulate rare-earth oxide are set to A and B, respectively, the compositional ratio between the particulate noble metal and the particle of at least one kind of rare-earth oxide contained in the electrode catalyst of the invention is preferably 0.01 to 4.0, more preferably 0.3 to 3.0, in a molar ratio of B to A (B/A). A molar ratio of less than 0.01 will result in an insufficient amount of the particulate rare-earth oxide, and thus will lead to poor formation of the interface providing the active site. Conversely, a molar ratio of more than 4.0 will result in an excessive amount of rare-earth oxide, producing a structure in which the rare-earth oxide covers up the particulate noble metal, and again will lead to a reduced interface. In both instances, oxygen reduction activity cannot be enhanced.

The particulate rare-earth oxide having an alkaline-earth metal as solid solution therein, preferably contained in the electrode catalyst of the invention, preferably has a rare-earth oxide to alkaline-earth metal molar ratio of 1:0.005 to 1:0.3. An alkaline-earth metal molar ratio of less than 0.005 is unfavorable because of no enhancement in oxygen ion and electrical conductivities. An alkaline-earth metal molar ratio of more than 0.3 is also unfavorable because the alkaline-earth metal cannot form solid solution.

The particulate noble metal, the particulate rare-earth oxide, and the alkaline-earth metal collectively mean an electrode catalyst substance herein.

The proportion of the electrode catalyst substance is preferably 10 to 90% by weight, based on the weight of the particulate carbon. An insufficient amount of the electrode catalyst substance will result in the reduced total reaction surface area of the substance, and thus will not produce sufficient oxygen reduction activity. Alternatively, an excessive amount of the electrode catalyst substance will result in the substance becoming prone to flocculate, lead to reducing the total reaction surface area of the substance, and thus not producing sufficient oxygen reduction activity.

The present invention relates to an electrode catalyst, particularly an electrode catalyst suitable for a gas diffusion electrode, and to a process for preparing the electrode catalyst. More specifically, the invention relates to an electrode catalyst suitable for a gas diffusion electrode for oxygen reduction, applied to an oxygen cathode for brine electrolysis, a metal-air battery, or the like.

The process for preparing the electrode catalyst of the invention is described below. Various methods may be used to support noble metal on a conductive carrier; the following method is generally used.

(1) A Method for Supporting Noble Metal

A particulate carbon powder is generally used as a conductive carrier. The case of employing the powder as the carrier is described below as one example.

In a dispersion step, a particulate carbon powder is first dispersed in noble metal salt dissolved in a solvent. The noble metal salt may be any noble metal salt capable of being dissolved in a solvent, including the nitrate, chloride, sulfate, carbonate, or acetate of a noble metal.

The solvent used is generally water. Optionally, a small amount of alcohol, organic solvent, acid, alkali, or the like may be also employed. Any solvent in which noble metal salt can be dissolved may be used.

In order to disperse the particulate carbon powder in the noble metal salt solution, various methods may be used, including agitation using a stirrer or a stirring rod, use of a kneader, ultrasonic dispersion, use of a homogenizer, use of an ultrasonic homogenizer, or the like. The method involving agitation using a stirrer is typically employed because of its ease at use.

In a reduction step, the noble metal ion is then reduced using a reducing agent to support the noble metal on the particulate carbon powder. The reducing agent used may be hydrazine, formalin, or the like. The reduction treatment is followed by filtration, washing and drying to provide a noble metal-loaded carbon powder.

Alternatively, the following additional supporting method may be also used.

In a dispersion step, the particulate carbon powder is first dispersed in a solution of noble metal salt. The noble metal salt may be any noble metal salt capable of being dissolved in a solvent, including the nitrate, chloride, sulfate, carbonate, or acetate of noble metal. The nitrate is preferred because it is almost free from the remaining of chlorine, sulfur, or the like after thermal decomposition.

The solvent used is generally water. Optionally, a small amount of alcohol, organic solvent, acid, alkali, or the like may be also employed. Any solvent in which noble metal salt can be dissolved may be used.

In order to disperse the particulate carbon powder in the noble metal salt solution, various methods may be used, including agitation using a stirrer or a stirring rod, use of a kneader, ultrasonic dispersion, use of a homogenizer, use of an ultrasonic homogenizer, or the like. The method involving agitation using a stirrer is typically employed because of its case of use.

In a drying step, the suspension is then evaporated to dry. The drying method may be any method by which the solvent can be removed, including retention in a dryer or an oven at 100° C. for 12 hours, use of a vacuum dryer or an evaporator, or the like.

In a firing step, a catalyst precursor, which is the dispersion of the nitrate and the particulate carbon obtained in the preceding step, is subjected to thermal decomposition reaction to provide a noble metal-loaded carbon powder having the highly dispersed particulate noble metal. In order to avoid progression of oxidation of the particulate carbon on the conductive carrier, heating is preferably carried out in a non-oxidative atmosphere of nitrogen or the like. However, if the particulate noble metal can be formed at such a low temperature that the particulate carbon is not oxidized, heating can be performed even in air or an atmosphere containing oxygen. The temperature used during firing, at which the noble metal is formed by thermal decomposition, is preferably as low as possible. The preferred firing temperature is 200 to 700° C. If firing is performed at too high temperature, then the particulate noble metals will flocculate, resulting in a larger diameter of the noble metal. Alternatively, if firing is carried out at too low temperature, then the thermal decomposition of noble metal salt will not completely occur, thus, producing no particulate noble metal. Firing/thermal decomposition time is preferably 1 to 10 hours.

(2) A Method for Supporting a Particle of Rare-Earth Oxide Having an Alkaline-Earth Metal as Solid Solution Therein A method for supporting rare-earth oxide having an alkaline-earth metal as solid solution therein is then described. In this respect, the case of employing a silver-loaded carbon powder as a noble metal-loaded conductive carrier is described below as one example.

In a dispersion step, a carbon powder is first dispersed in a solution containing rare-earth salt and alkaline-earth metal salt. The rare-earth salt is preferably a nitrate because the nitrate is subjected to firing in an atmosphere of an inert gas in a firing step to provide rare-earth oxide. Preferably, the alkaline-earth metal salt is also a nitrate because a chloride, a sulfate, or the like produces remaining chlorine, sulfur or the like, respectively, after firing.

In order to disperse the silver-loaded carbon powder in this solution, various methods may be used, including agitation using a stirrer or a stirring rod, use of a kneader, ultrasonic dispersion, use of a homogenizer, use of an ultrasonic homogenizer, or the like. The method involving agitation using a stirrer is typically employed because of its ease of use.

This solution may be directly dried in a subsequent drying step. However, an alkali metal such as sodium hydroxide or ammonia may also be added to form a hydroxide, followed by evaporation to dryness.

In a drying step, the suspension is then evaporated to dryness. The drying method may be any method by which the solvent can be removed, including retention in a dryer or an oven at 100° C. for 12 hours, use of a vacuum dryer or an evaporator, or the like.

In a firing step, the electrode substance obtained from the above drying step is subjected to thermal decomposition reaction to support, on the carbon, the rare-earth oxide having the alkaline-earth metal as solid solution therein. In order to avoid progression of oxidation of the particulate carbon on the conductive carrier, heating firing is preferably carried out in a non-oxidative atmosphere of nitrogen or the like. However, if a particle of the rare-earth oxide having the an alkaline-earth metal as solid solution therein can be formed at such a low temperature that the particulate carbon is not oxidized, heating can be performed even in air or an atmosphere containing oxygen. The firing temperature, at which the rare-earth oxide having the alkaline-earth metals are allowed to form solid solution therein is formed by thermal decomposition, is preferably as low as possible. The preferred firing temperature is 200 to 1,000° C. In addition, retention time is preferably 1 to 10 hours. If firing is performed at too high of a temperature, then the particles of rare-earth oxide having divalent metal allowed to form solid solution therein will flocculate, resulting in a larger diameter of the particle. Alternatively, firing at too low of a temperature is unfavorable because the thermal decomposition of rare-earth nitrate will not completely occur to produce the residue thereof, or because alkaline-earth metal will not form solid solution in rare-earth oxide.

After the heat treatment, the powder produced is optionally pulverized. Thereafter, the powder pulverized may be used for preparing a gas diffusion electrode, or for supporting a metal or an oxide thereof. The pulverization may be carried out by a variety of methods using a mortar, various mills, or the like.

In order to prepare the electrode catalyst of the invention, (1) a silver particle is supported on a particulate carbon powder, and (2) a particle of rare-earth oxide having divalent metal that is allowed to form solid solution therein is supported on the powder. However, step (1) and step (2) may be performed in any order: the silver particle may be formed on the particulate carbon, followed by supporting the particle of rare-earth oxide having an alkaline-earth metal as solid solution therein, or the particle of rare-earth oxide having alkaline-earth metal are allowed to form a solid solution therein may be formed on the particulate carbon, followed by supporting the silver particle. Further, the silver particle and the particle of rare-earth oxide having divalent metal that is allowed to form a solid solution therein may be supported simultaneously on the particulate carbon, using a mixed solution of silver salt, rare-earth salt, and alkaline-earth metal salt. In addition, many kinds of rare-earth oxides and silver may be supported. In addition to the above methods, the supporting on the particulate carbon may be carried out using a colloidal solution of silver or rare-earth oxide, or a suspension having powder dispersed in a solvent. Further, a mixed solution of salts of noble metal, rare-earth metal, and alkaline-earth metal may be also added into an alkali solution to generate a gel or fine particles of metal hydroxides, to which the particulate carbon is then added before well stirring, followed by washing, drying and firing to prepare the electrode catalyst of the invention.

(3) A Method for Supporting Rare-Earth Oxide Having Noble Metal and an Alkaline-Earth Metal as Solid Solution Therein.

A method for preparing an electrode catalyst utilizing metal hydroxide is described below.

Salts of noble metal, rare-earth metal, and alkaline-earth metal may be selected according to the type and composition of a desired electrode catalyst. The salts include a nitrate, a chloride, a sulfate, a carbonate, an acetate, or the like. However, a nitrate is preferred because it is subjected to firing in an atmosphere of an inert gas in a firing step to easily provide a rare-earth oxide. Preferably, the alkaline-earth metal salt is also a nitrate because a chloride, a sulfate, or the like produces remaining chlorine, sulfur or the like, respectively, after firing. Particularly, when silver is employed as a noble metal, use of its chloride is unfavorable because of the presence of a fraction of a chloride ion that induces rapid precipitation of silver chloride and thus, reduced dispersibilities of silver and the rare-earth oxide as well as a compositional change, leading to the generation of a non-uniform catalyst.

The solvent used is generally water. Optionally, a small amount of alcohol, organic solvent, or the like may be also employed. Any solvent in which metal salt can be dissolved may be used.

In this method, alkali is used since metal hydroxide is prepared. The alkali preferably contains no metal components, such as aqueous ammonia, tetraalkylammonium, or the like which can produce a suspension containing a gel or fine particles of metal hydroxide formed from metal salts e.g., a nitrates. Use of caustic soda, potassium hydroxide, or the like is unfavorable because sodium or potassium might form a solid solution in a rare-earth oxide.

In a step for metal hydroxide preparation, a mixed solution of metal salts corresponding to the composition of a desired electrode catalyst is added into an alkali solution to generate the gel or fine particles of metal salt.

The pH of the alkali solution is preferably controlled until the addition of the mixed solution of the metal salts is completed, and the preferred pH region is 13 or more. Since it is preferably nitrate-based, the mixed solution of the metal salts has pH that decreases gradually by neutralization for every addition of the solution. As a result, generation conditions for metal hydroxide are varied, and the size of the metal oxide gel or particle is changed. Therefore, the alkali is preferred to be in an excess amount compound to the metal salt. The alkali ratio to metal salt is preferably 20:1 or more by reference to the total number of moles in the solution.

The mixed solution of the metal salts is added in small amounts by the drop, and the alkali solution is preferably added with stirring. When adding solution by the drop, a method using a buret or the like is preferably used because of its case of use. Further, for the stirring, a method involving stirring with a stirrer is preferably employed because of its ease of use.

In a dispersion step, a particulate carbon powder is added to and dispersed in the suspension of the generated gel or fine particles of metal hydroxide. If the metal hydroxide flocculates to produce precipitation or the like, it is advantageous to remove the alkali content through filtration and washing and then to again perform dispersion to make a uniform suspension, which is followed by adding and dispersing the particulate carbon powder. The alcohol may be any kind of alcohol in which metal hydroxide can be uniformly dispersed. Ethanol, 1-propanol, 2-propanol, butanol, or the like may be used as the alcohol.

For the dispersion, various methods may be used, including agitation using a stirrer or a stirring rod, use of a kneader, ultrasonic dispersion, use of a homogenizer, use of an ultrasonic homogenizer, or the like. The method involving use of an ultrasonic homogenizer for stirring is employed in order to further enhance the dispersion.

In a drying step, the suspension with dispersed particulate carbons is filtrated, and the alkali content is then removed, followed by evaporation to dryness. The filtration may be carried out using any method by which the catalyst precursor consisting of the metal oxide and the particulate carbon can be taken out from the suspension. However, a method involving suction filtration using a filter paper or a filter fabric is preferably employed because of its ease of use. The drying may be performed using any method by which the solvent can be removed, including retention in a dryer or an oven at 100° C. for 12 hours, use of a vacuum dryer or an evaporator, or the like.

In a firing step, the catalyst precursor obtained from the above drying step is subjected to a thermal decomposition reaction for supporting, on the particulate carbon, in the form of the particulate rare-earth oxide having the particulate noble metal and an alkaline-earth metal as solid solution therein. In order to avoid progression of oxidation of the particulate carbon on the conductive carrier, heating firing is preferably carried out in a non-oxidative atmosphere of nitrogen or the like. However, if a particle of the rare-earth oxide having the alkaline-earth metal as solid solution therein can be formed at such a low temperature that the particulate carbon is not oxidized, firing can be performed even in air or an atmosphere containing oxygen. The firing temperature, at which the rare-earth oxide having the noble metal and the alkaline-earth metals is allowed to form solid solution therein is formed by thermal decomposition, is preferably as low as possible. Preferred firing temperature is 200 to 1,000° C. In addition, retention time is preferably 1 to 10 hours. If firing is performed at too high of a temperature, then the particle of the rare-earth oxide having the alkaline-earth metals allowed to form a solid solution therein will flocculate, resulting in the too larger diameter thereof. Alternatively, firing at too low of a temperature is unfavorable because the thermal decomposition of the rare-earth nitrate will not completely occur to produce the residue thereof, or because the alkaline-earth metal will not form a solid solution in the rare-earth oxide.

After the heat treatment, the powder produced is optionally pulverized. The powder pulverized may be thereafter used for preparing a gas diffusion electrode, or for supporting metal or metal oxide. The pulverization may be carried out by a variety of methods using a mortar, various mills, or the like.

Of the electrode catalyst obtained through these steps, the crystal structure may be determined using powder X-ray diffractometry.

Figure 1:
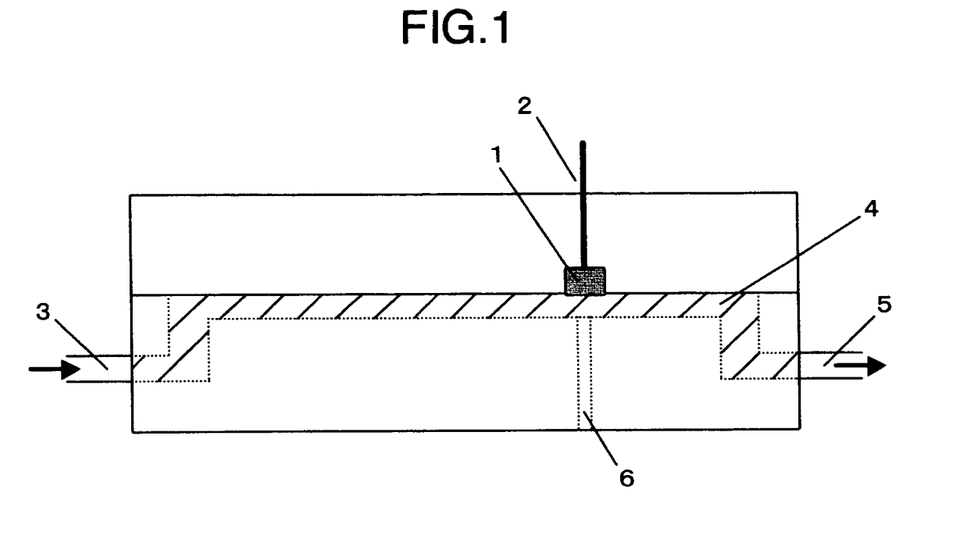
FIG. 1 is an illustrative picture of an evaluation device using a channel flow electrode method.

The electrode catalyst obtained by these methods was evaluated using a channel flow electrode method. The measuring cell shown in FIG. 1 was employed for the measurement based on the channel flow electrode method. The measuring cell indicated in FIG. 1 has a structure in which an oxygen-saturated electrolyte is introduced at an electrolyte inlet 3, passed through an electrolyte passage 4 with a thickness of 0.05 mm, and discharged at an electrolyte outlet 5. Under this situation, the flow of an electrolyte contacting a working electrode 1 is adequate if being in the form of a laminar flow. The acrylic resin plate has a cavity 2×5 mm in area, 2 mm in depth in a part thereof, and the cavity, filled with an electrode catalyst, is rendered the working electrode 1. The working electrode 1 has a working electrode wiring 2 for electric connection. A liquid-junction portion 6 with a reference electrode is also provided. The diffusion rate of dissolved oxygen in the electrolyte can be controlled by changing the flow rate of the electrolyte. The electrolyte is flowed at a fixed flow rate to allow oxygen reduction reaction to occur on the working electrode 1, and current-voltage characteristics (I-V characteristics) at the time are measured to evaluate oxygen reduction activity.

A gas diffusion electrode using the above described electrode catalyst for oxygen reduction is described below.

Figure 4:
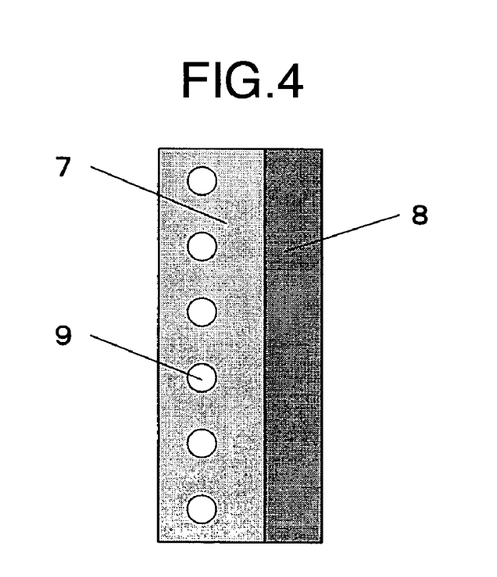
FIG. 4 is an illustrative picture of a gas diffusion electrode.

As shown in FIG. 4, the gas diffusion electrode is a laminated structure between a gas diffusion layer 7 and a reaction layer 8, inside which a collector 9 for electric connection is embedded. Oxygen is supplied from the gas diffusion side, and the reaction layer is in contact with an electrolyte. After permeating through the gas diffusion layer and diffusing therein, the oxygen is subjected to reduction reaction on the oxygen reduction catalyst fixed to the reaction layer.

In the gas diffusion layer 7, it is necessary that the oxygen gas can permeate rapidly through this layer and can diffuse uniformly in the whole reaction layer, and the diffusion layer is also required to serve to inhibit the penetration of the electrolyte from the reaction layer side. Anything in which these two functions are satisfied may be used. However, a powder may be employed here, obtained by mixing and dispersing a particulate carbon in a suspension of a fluororesin such as polytetrafluoroethylene with high water repellency before filtration and drying. Preferably, the particulate carbon in the gas diffusion layer 7 uses a particulate carbon having a high water repellency and a large particle diameter.

In the reaction layer 8, it is necessary that a catalyst for oxygen reduction be fixed while it is highly dispersed and the area of a three-phase interface among oxygen gas, the oxygen reduction catalyst, and the electrolyte be formed in a sufficiently large size. The powder for reaction layer may use a pulverized powder which is obtained by mixing the electrode catalyst for oxygen reduction with a suspension of a fluororesin such as polytetrafluoroethylene and dispersing the mixture using a dispersion solvent such as alcohol before filtration and drying.

The collector 9 may be any material which has a sufficient electric conductivity for electrical connection, and does not produce dissolution, corrosion, or the like in an electric potential in which oxygen reduction occurs. A metal gauze such as nickel or silver, a foam, or the like may be used.

The gas diffusion electrode may be prepared by: providing a nickel gauze or the like for a collector in a die in prescribed form; packing powder particles for gas diffusion layer on the collector and, in turn, powder particles for reaction layer thereon, followed by cold pressing; and finally melting the fluororesin by hot pressing for integration.

A method for preparing the gas diffusion electrode of the invention is described below in details.

A powder for reaction layer is obtained by intimately dispersing and mixing an electrode catalyst for oxygen reduction and a fluororesin such as polytetrafluoroethylene into the form of a suspension, followed by filtration, drying, and, if necessary, pulverization.

A solvent used for the dispersion is generally water. Optionally, alcohol, organic solvent, or the like may be also used as the solvent. To enhance dispersibility, various surfactants may be optionally added. However, the remaining of surfactant in the powder for reaction layer prepared is unfavorable, and therefore it should be removed by washing with alcohol, firing treatment, or the like.

The fluororesin may be any floroesin which firmly binds the catalyst for oxygen reduction and can impart high water repellency. Polytetrafluoroethylene (PTFE), tetrafluoroethylene-hexafluoropropene copolymer (FEP), tetrafluoroethylene-perfluoroalkylvinylether copolymer (PFA), or the like may be used as the fluororesin. Typically, a liquid in which their particles are suspended in water using a surfactant is employed. However, a fine powder of fluororesin may be optionally used.

For the dispersion, it is possible to use various methods including agitation using a stirrer or a stirring rod, use of a kneader, ultrasonic dispersion, use of a homogenizer, use of an ultrasonic homogenizer, or the like. In order to enhance the dispersion of solid particles from each other, the method using an ultrasonic homogenizer is prefered.

For the filtration of the dispersion, it is possible to filtrate the dispersion directly using a method such as suction filtration. Preferably, an alcohol such as ethanol is added to agglutinate, to a degree, a catalyst for oxygen reduction and particles of fluororesin, before filtration. This is because the surfactant producing the suspension of fluororesin particles is released by the addition of alcohol, enabling the catalyst for oxygen reduction and the particles of fluororesin to be agglutinated in a highly dispersed condition.

The drying method may be any method by which the solvent can be removed, including retention in a dryer or an oven at about 100° C. for 12 hours or more, use of a vacuum dryer, or the like.

For pulverizing the dried powder for reaction layer, a variety of methods including use of a mortar, various mills, or the like may be employed, depending on particle size.

The compositional ratio between the catalyst for oxygen reduction and the fluororesin in the powder for reaction layer has a large influence on the performance of a gas diffusion electrode. When the weights of the particulate carbon in the catalyst for oxygen reduction and the fluororesin are set to C and F, respectively, the weight ratio of the fluororesin to the particulate carbon in the catalyst for oxygen reduction is represented by F/C. The value of F/C is preferably 0.1 to 1, more preferably 0.2 to 0.7. An F/C value of less than 0.1 will result in an insufficient amount of fluororesin, and thus will lead to poor binding properties of the reaction layer, producing the gas diffusion electrode with insufficient strength. Alternatively, an F/C value of more than 1 will result in an excessive amount of fluororesin. This will result in the decreased area of a three-phase interface due to the surface of the catalyst for oxygen reduction covered by the fluororesin, and the reduced performance of the gas diffusion electrode owing to the increased electrical resistance thereof.

The powder for the gas diffusion layer may be prepared in almost the same way as for the powder for the reaction layer, except for using a particulate carbon itself instead of the catalyst for oxygen reduction.

In a step molding into a gas diffusion electrode, the powder for reaction layer prepared by the above described method, a powder for gas diffusion layer, and a collector are packed in a die, followed by the step for the preparation of a gas diffusion electrode using a hot pressing.

The collector may be any material which has a sufficient electric conductivity for uniform electrical connection in the in-plane direction of the gas diffusion electrode, and does not produce dissolution, corrosion, or the like in an electric potential in which oxygen reduction occurs. A metal gauze such as nickel or silver, a foam, or the like may be used as material for the collection.

The condition for hot pressing may be any condition which produces the melting of the fluororesin dispersed in powders for reaction and gas diffusion layers and includes a temperature and a pressing pressure that enables the molding into a gas diffusion electrode. The hot pressing temperature is preferably 370 to 400° C. Since the melting point of fluororesin is approximately 380° C., a hot pressing temperature lower than the melting point will result in unmelted fluororesin, and thus in insufficient binding, leading to the reduced strength of the gas diffusion electrode. Conversely, a higher hot pressing temperature will result in a catalyst for oxygen reduction covered by melted and fluidized fluororesin resulting in the decreased area of a three-phase interface, leading to the reduced performance of the electrode. The pressing pressure is preferably 30 to 200 kgf/cm$^2$. A pressing pressure lower than 30 kgf/cm$^2$ will result in insufficient binding that reduces the strength of a gas diffusion electrode, and may induce the penetration of an electrolyte into the electrode due to the likelihood of increased voids. Conversely, a pressing pressure of higher than 200 kgf/cm$^2$ will result in decreased voids in the gas diffusion electrode, and thus in an insufficient oxygen gas supply to the catalyst for oxygen reduction, leading to the reduced performance of the electrode.

In the case of preparation of a large gas diffusion electrode, a powder for reaction layer or gas supply layer can be optionally dispersed in a solvent to produce a slurry, followed by forming the slurry in the form of a film using a coating machine or the like. The reaction layer and the gas diffusion layer that are formed in film form, and the collector may be joined on top of each other, followed by integral molding through hot pressing to prepare a large gas diffusion electrode.

The gas diffusion electrode obtained by the above method may be inserted into a cell for evaluating electrochemical characteristics, and allowed to effect an oxygen reduction reaction through supplying oxygen or air from the gas diffusion layer to measure an electrode potential in each current density in order to evaluate the electrode performance.

The present invention is described in further details, based on Examples and the like. However, the invention is not intended to be limited in any manner by these Examples and the like.

EXAMPLE 1

Preparation of a Silver-Loaded Carbon

A carbon containing 50% by weight of silver was prepared as described below.

Two grams of carbon black (from Mitsubishi Chemical Corporation: Ketjen Black EC-600JD) are ground using a mill (from Janke & Kunkel Co.: A10) and 3.15 g of silver nitrate (from Wako Pure Chemical Industries Ltd.) and then dispersed in 200 ml of an aqueous solution. This dispersion was stirred for 15 minutes using a stirrer, and then subjected to the evaporation of the water content in an oven at 100° C., followed by drying to provide a powder. Subsequently, this powder was subjected to firing in a stream of nitrogen at 250° C. for one hour, to thermally decompose silver nitrate, using an inert gas firing furnace (from Yamada Electric MFG. Co., Ltd.: Model VMF165), and then this powder was ground using the mill to provide a carbon containing 50% by weight of silver.

The resulting rare-earth oxide has an alkaline-earth metal as solid solution therein.

0.217 g of cerium nitrate ($Ce(NO_3)_3.6H_2O$, from Wako Pure Chemical Industries Ltd.) and 0.0055 g of strontium nitrate ($Sr(NO_3)_2$, from Wako Pure Chemical Industries Ltd.) was dissolved in water to provide a silver to cerium to strontium molar ratio of 1:1:0.05, and 0.108 g of the silver-loaded carbon powder was added to this aqueous solution, followed by ultrasonic dispersion for 5 minutes. Subsequently, the water content was evaporated in an oven at 100° C., followed by drying to provide a sample powder. This powder was subjected to firing in a stream of nitrogen at 400° C. for one hour, using the inert gas firing furnace, and ground employing the mill to provide an electrode catalyst powder.

The powder X-ray diffraction of the electrode catalyst powder was measured. The apparatus for the diffraction used was RINT-2500 (from Rigaku Corporation), and the radiation source employed was copper Kα radiation ($\lambda=1.54184$ Å). Identification of a peak provided the detection of Ag and $CeO_2$. A diffraction angle (2θ) corresponding to the main diffraction line of $CeO_2$ (111) was 28.585°. The conversion of this to a grating constant provided 5.409 Å. The grating constant of $CeO_2$ alone is 5.411 Å; the solid solution of strontium in a $CeO_2$ crystal produced has a decreased grating constant.

Figure 2:
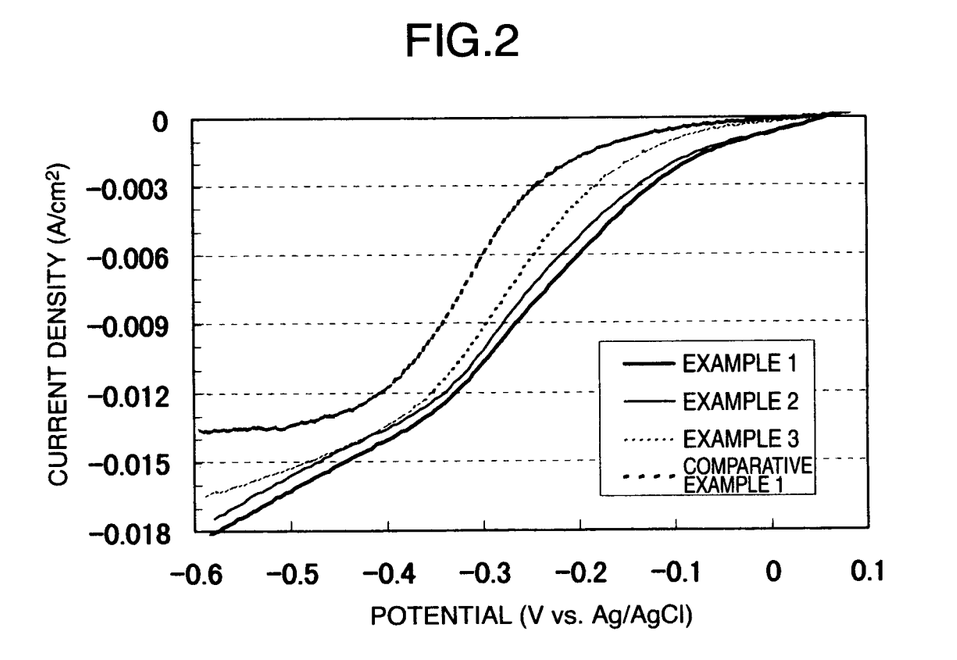
FIG. 2 is an illustration of the result of evaluating electrode catalysts in Examples and Comparative Example, using a channel flow electrode method.

A small amount of liquid paraffin (from Kishida Chemical Co., Ltd.) was added to the electrode catalyst powder thus prepared, followed by mixing in a mortar to produce a paste. This paste was packed in a working electrode portion, for evaluation using a channel flow electrode method. A platinum wire and a silver/silver chloride electrode were rendered a counter electrode and a reference electrode, respectively. Bubbling was carried out in a 0.1 M aqueous sodium hydroxide solution with pure oxygen for one hour to make this aqueous sodium hydroxide solution oxygen-saturated. In addition, the solution, the flow rate of which was fixed at 83.2 cm/sec, was kept at −0.6 V for 10 minutes, and the working electrode was then swept at 10 mV/sec from the potential +0.1 V to −0.6 V to measure a potential-current curve. The results obtained are depicted in FIG. 2. A higher oxygen reduction activity for Example 1 compared to Comparative Example 1 is shown.

EXAMPLE 2

Magnesium nitrate ($Mg(NO_3)_2.6H_2O$ (from Wako Pure Chemical Industries Ltd.) was used instead of strontium nitrate in Example 1 so as to provide a silver to cerium to magnesium molar ratio of 1:1:0.05. However, preparation and evaluation were carried out otherwise as described in Example 1. The measurement of the powder X-ray diffraction of the electrode catalyst powder prepared resulted in the detection of Ag and $CeO_2$. A diffraction angle (2θ) corresponding to the main diffraction line of $CeO_2$ (111) was 28.669°. The conversion of this to a grating constant provided 5.393 Å. The grating constant of $CeO_2$ alone is 5.411 Å. The solid solution formation of magnesium produced the decreased grating constant.

The measurement of a potential-current curve using a channel flow electrode is depicted in FIG. 2; higher oxygen reduction activity was shown.

EXAMPLE 3

As described in Example 1, a carbon containing 50% by weight of silver was prepared. 0.108 g of the silver-loaded carbon powder were added to 0.217 g of cerium nitrate (Ce $(NO_3)_3.6H_2O$, from Wako Pure Chemical Industries Ltd.) to provide a silver to cerium molar ratio of 1:1. This mixture was dispersed in water, was subjected to ultrasonic dispersion for 5 minutes, subjected to the evaporation of the water content in an oven at 100° C., and was dried to provide a sample powder. This powder was subjected to firing in a stream of nitrogen at 400° C. for one hour, using an inert gas firing furnace, and ground using the mill to provide an electrode catalyst powder.

The measurement of the powder X-ray diffraction of the electrode catalyst powder prepared resulted in the detection of Ag and $CeO_2$. A diffraction angle (2θ) corresponding to the main diffraction line of $CeO_2$ (111) was 28.464°. The conversion of this to a grating constant provided 5.411 Å.

The measurement of a potential-current curve using a channel flow electrode is depicted in FIG. 2. The oxygen reduction current increased from a lower potential compared to that in Examples 1 or 2, but a sufficiently high oxygen reduction potential was shown.

Comparative Example 1

For the silver-loaded carbon powder prepared in Example 1, the measurement of a potential-current curve using a channel flow electrode is depicted in FIG. 2. The oxygen reduction current increased from a further lower potential compared to that in Examples 1, 2 or 3.

EXAMPLE 4

Preparation of a Powder for Reaction Layer

As described in Example 1, an electrode catalyst was prepared, which has a cerium oxide particle, supported on a carbon carrier, having a silver particle and strontium allowed to form solid solution therein so as to provide a silver to cerium to strontium molar ratio of 1:1:0.05. Fifteen (15) ml of ethanol:water=1:60 (weight ratio) was added to 0.18 g of the resultant electrode catalyst, and then 0.04 g of polytetrafluoroethylene dispersion (from Daikin Industries Ltd., POLYFLON™ TFE D-1 (solid content: 60%)), followed by stirring for one hour, filtration, and drying at 100° C. for 24 hours. Subsequently, dispersion was carried out for 10 minutes, using a sonicator (from Nihon Seiki Seisakusho Co., Ltd.: US-600T), and 30 ml of ethanol was then added, followed by stirring for 30 minutes. After filtration, this was dried at 100° C. for 24 hours, followed by pulverization using a mill to provide a powder for the reaction layer.

Preparation of a Powder for Gas Diffusion Layer

A polytetrafluoroethylene dispersion (from Daikin Industries Ltd., POLYFLON™ TFE D-1 (solid content: 60%)) was added to a mixture of carbon black (from Denki Kagaku Kogyo K. K.: Denka Black AB-7™): surfactant (from Rohm and Haas Co.: Triton X-100): water=1:1:20 (weight ratio) so as to provide a carbon black to polytetrafluoroethylene weight ratio of 7:3, followed by dispersing for 10 minutes using a sonicator. Ethanol was then added to aggregate particles in the dispersion. Subsequently, suction filtration was performed, and the resultant solid content was dried at 100° C. for 24 hours, followed by grinding using a mill for pulverization. This powder was then stirred in ethanol for one hour to wash and remove the surfactant. Thereafter, this was pulverized using a mill to provide a powder for gas diffusion layer.

Preparation of a Gas Diffusion Electrode

An aluminum foil clarified with acetone was placed on the bottom of a die for hot pressing having an internal diameter of 20 mm, a 100-mesh nickel gauze having a wire diameter of 0.1 mm was placed on the aluminum foil, and 0.1 g of the powder for gas diffusion layer was packed before packing 0.05 g of the powder for reaction layer, followed by cold pressing.

Subsequently, the die was held in a hot pressing machine (from Tester Sangyo Co., Ltd.: SA-303) while maintaining at 380° C. to perform hot pressing at 60 kg/cm$^2$ for one minute to provide a gas diffusion electrode.

Evaluation of Electrochemical Characteristics of the Gas Diffusion Electrode

The gas diffusion electrode obtained was mounted in a cell for evaluation of electrochemical characteristics, and evaluated for electrochemical characteristics of oxygen reduction reaction by supplying pure oxygen at 30 ml/min from the gas diffusion layer side in a 33 wt % sodium hydroxide aqueous solution at 80° C.

The cell for electrochemical evaluation has a structure in which passages for oxygen supply and for discharge are formed and the gas diffusion electrode is mounted through an O-ring to keep airtightness in the cell. After placing the cell in an electrolytic bath, the evaluation of electrochemical characteristics was performed by supplying oxygen from the gas diffusion layer side at a state where only the reaction layer side was exposed to the 33 wt % sodium hydroxide aqueous solution at 80° C. The effective surface area of the gas diffusion electrode is 3.14 cm$^2$. HC-113 from Hokuto Denko Co., Ltd. was used as a current pulse generator, and a platinum gauze and a mercury/mercury oxide electrode were employed as a counter electrode and a reference electrode, respectively.

Figure 3:
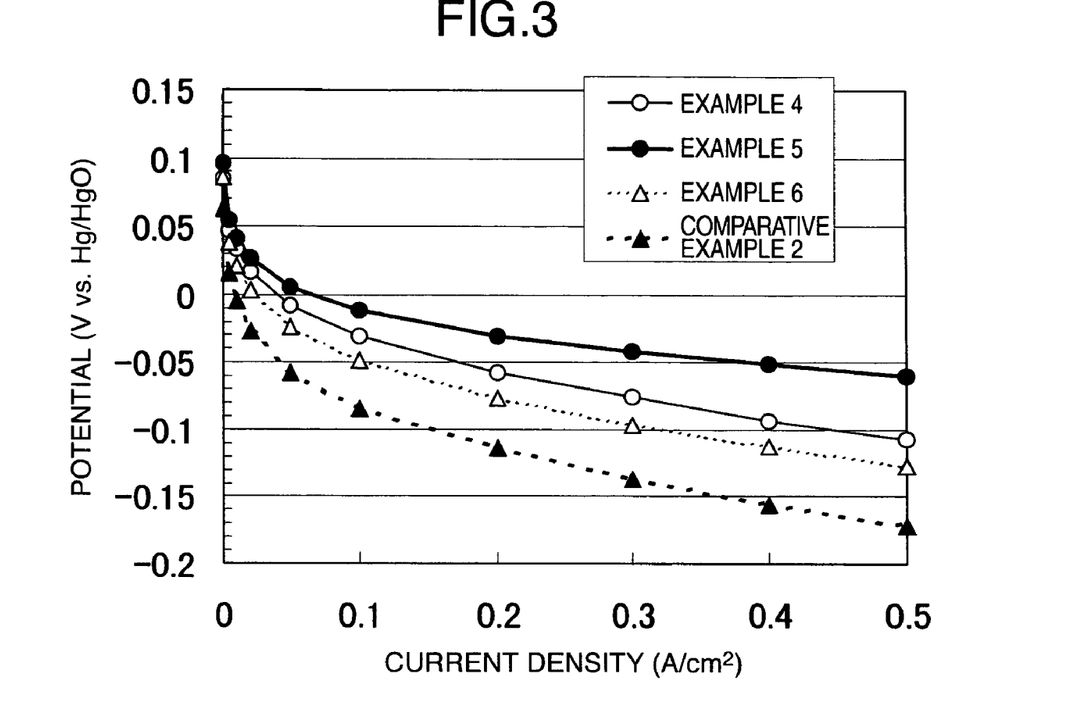
FIG. 3 is an illustration of the result of evaluating electrochemical characteristics of gas diffusion electrodes in Examples and Comparative Example.

The result of the electrochemical evaluation is depicted in FIG. 3. The horizontal and vertical axes represent current density and potential with respect to the mercury/mercury oxide electrode, respectively. As shown in FIG. 3, excellent electrode characteristics were observed compared to those in Comparative Example 2 as described below.

EXAMPLE 5

Preparation of a Carbon Supporting a Silver Particle and a Rare-Earth Oxide Having an Alkaline-Earth Metal as Solid Solution Therein To 80 g of water were added 0.0944 g of silver nitrate (AgNO$_3$, from Wako Pure Chemical Industries Ltd.), 0.217 g of cerium nitrate (Ce(NO$_3$)$_3$.6H$_2$O, from Wako Pure Chemical Industries Ltd.), and 0.0118 g of strontium nitrate (Sr(NO$_3$)$_2$, from Wako Pure Chemical Industries Ltd.) to provide a silver to cerium to strontium molar ratio of 1:1:0.1, followed by stirring to prepare a mixture of the metal salts.

Then, 13.3 g of a 15% tetramethylammonium hydroxide aqueous solution ((CH$_3$)$_4$NOH, from Wako Pure Chemical Industries Ltd.) was added to 150 g of water, followed by stirring to prepare an alkali solution of pH 14.

The above described mixed solution of the metal salts was added by the drop to the alkali solution at 5 ml/min through a buret while stirring viscously using a magnetic stirrer. The suspension containing the generated orange-colored metal hydroxide particles was subjected to suction filtration, followed by removing the alkali content through washing. Subsequently, the filter cake was transferred into 200 ml of 2-propanol, and redispersed for 30 minutes using a sonicator to provide a uniform suspension.

0.06 g of carbon black (from Mitsubishi Chemical Corporation: Ketjen Black EC-600JD) was added to the dispersion, ground using a mill, dispersed in 30 g of 2-propanol (from Wako Pure Chemical Industries Ltd.) for 10 minutes with a sonicator, followed by further dispersing for 15 minutes using the sonicator.

The above described dispersion obtained was subjected to suction filtration, followed by drying in an oven at 100° C. to provide a sample powder. This powder was fired in a stream of nitrogen at 400° C. for one hour employing an inert gas firing furnace, and ground using a mill to provide an electrode catalyst powder. The powder X-ray diffraction of this electrode catalyst powder enabled the identification of Ag and CeO$_2$ having strontium allowed to form solid solution therein, as in Example 1.

A powder for reaction layer was produced, and combined with a powder for gas diffusion layer to prepare a gas diffusion electrode, just as described in Example 4, except for use of the electrode catalyst powder obtained as described above. The result of evaluating electrochemical characteristics of this gas diffusion electrode is shown in FIG. 3. A better performance was observed than that in Comparative Example 2, and in Example 4.

EXAMPLE 6

As described in Example 3, an electrode catalyst having a silver particle and a particulate cerium oxide supported on a carbon carrier was prepared in a silver to cerium molar ratio of 1:1. A gas diffusion electrode was prepared and evaluated as described in Example 4, except for use of this electrode catalyst. The result of evaluation obtained is shown in FIG. 3.

Comparative Example 2

A gas diffusion electrode was prepared and evaluated as described in Example 4, except for use of the carbon containing 50 wt % silver produced in Example 1 as an electrode catalyst. The result of evaluation obtained is shown in FIG. 3.

The electrode catalyst of the present invention exhibits high oxygen reduction activity as an electrode catalyst for oxygen reduction by forming a solid solution of alkaline-earth metal in a composite catalyst of a silver particle and a particulate rare-earth oxide, preferably in the rare-earth oxide. Use of the electrode catalyst of the invention for a gas diffusion electrode may reduce oxygen reduction overvoltage in the electrolysis of an alkali metal halide aqueous solution such as brine using an ion exchange membrane. As a result, it has become possible to reduce the electric power used for electrolysis to manufacture products such as chlorine and caustic soda, thus resulting in a lower cost.

The invention claimed is:

1. An electrode catalyst, comprising:
   a conductive carrier, and
   a mixture containing a particulate noble metal and at least one particulate rare-earth oxide, the mixture being supported on said conductive carrier,
   wherein said particulate rare-earth oxide has an alkaline-earth metal as solid solution therein.

2. The electrode catalyst according to claim 1, wherein said conductive carrier is a particulate carbon.

3. The electrode catalyst according to claim 2, wherein said noble metal is silver, platinum, or palladium.

4. The electrode catalyst according to claim 3, wherein said noble metal is silver.

5. The electrode catalyst according to claim 4, wherein the molar ratio of said noble metal to said rare-earth oxide is from 1:0.01 to 1:4.0.

6. The electrode catalyst according to claim 5, wherein said rare-earth oxide is cerium oxide.

7. The electrode catalyst according to claim 6, wherein said alkaline-earth metal is at least one selected from a group consisting of magnesium, calcium, and strontium.

8. The electrode catalyst according to claim 7, wherein the molar ratio of said cerium oxide to said alkaline-earth metal is from 1:0.005 to 1:0.3.

9. A gas diffusion electrode for brine electrolysis, characterized by use of the electrode catalyst according to claim 8.

10. A process for preparing a gas diffusion electrode for brine electrolysis comprising laminating a reaction layer containing the electrode catalyst according to claim 8, a gas diffusion layer containing a conductive carrier, and a collector.

11. A method for using the electrode catalyst according to claim 8, characterized in that the electrode catalyst is used as a catalyst component for the reaction layer of a gas diffusion electrode for brine electrolysis.

12. A method for gas diffusion electrode-based brine electrolysis, comprising using the electrode catalyst according to claim 8.

13. The electrode catalyst according to claim 1, wherein said noble metal is silver, platinum, or palladium.

14. The electrode catalyst according to claim 1, wherein said noble metal is silver.

15. The electrode catalyst according to claim 1, wherein the molar ratio of said noble metal to said rare-earth oxide is from 1:0.01 to 1:4.0.

16. The electrode catalyst according to claim 1, wherein said rare-earth oxide is cerium oxide.

17. The electrode catalyst according to claim 16, wherein the molar ratio of said cerium oxide to said alkaline-earth metal is from 1:0.005 to 1:0.3.

18. The electrode catalyst according to claim 1, wherein said alkaline-earth metal is at least one selected from a group consisting of magnesium, calcium, and strontium.

19. A gas diffusion electrode for brine electrolysis, characterized by use of the electrode catalyst according to claim 1.

20. A process for preparing a gas diffusion electrode for brine electrolysis comprising laminating a reaction layer containing the electrode catalyst according to claim 1, a gas diffusion layer containing a conductive carrier, and a collector.

21. A method for using the electrode catalyst according to claim 1, characterized in that the electrode catalyst is used as a catalyst component for the reaction layer of a gas diffusion electrode for brine electrolysis.

22. A method for gas diffusion electrode-based brine electrolysis, comprising using the electrode catalyst according to claim 1.

23. An electrode catalyst comprising a conductive carrier, and a mixture containing a particulate noble metal and at least one particulate rare-earth oxide, the mixture being supported on the conductive carrier,
   wherein the conductive carrier comprises carbon powder, and
   wherein the particulate rare-earth oxide has a particle diameter of 500 nm or less.

24. The electrode catalyst of claim 23, wherein the particulate noble metal has a particle diameter of 100 nm or less.

25. The electrode catalyst of claim 23, wherein the mixture is fixed to the conductive carrier.

26. A method for gas diffusion electrode-based brine electrolysis comprising using the electrode catalyst according to claim 23.

27. A gas diffusion electrode for brine electrolysis characterized by the use of the electrode catalyst according to claim 23.

28. A gas diffusion electrode for brine electrolysis comprising a gas diffusion layer and a reaction layer, said reaction layer comprises the electrode catalyst according to claim 23, wherein the electrode catalyst acts at a cathode for an oxygen reduction reaction.

29. An electrode catalyst comprising a conductive carrier, and a mixture containing a particulate noble metal and at least one particulate rare-earth oxide, the mixture being supported on the conductive carrier, wherein the particulate noble metal has a particle diameter of 200 nm or less, wherein the particulate rare-earth oxide has a particle diameter of 500 nm or less, and wherein the conductive carrier comprises carbon powder.

30. A process for preparing a gas diffusion electrode for brine electrolysis, comprising laminating a reaction layer containing an electrode catalyst, a gas diffusion layer containing a conductive carrier, and a collector,
   wherein the electrode catalyst comprises a mixture containing a particulate noble metal and at least one particulate rare-earth oxide, and the mixture being supported on the conductive carrier.

31. A gas diffusion electrode prepared by the process of claim 30.

32. A method for gas diffusion electrode-based brine electrolysis comprising using the electrode prepared by the process of claim 30.

33. An electrode catalyst comprising a conductive carrier, and a mixture containing a particulate noble metal and at least one particulate rare-earth oxide, the mixture being supported directly on the conductive carrier, wherein
   the conductive carrier further comprises carbon powder.

34. The electrode catalyst of claim 33, wherein the mixture is fixed to the conductive carrier.

35. A method for gas diffusion electrode-based brine electrolysis comprising using the electrode catalyst according to claim 33.

36. A gas diffusion electrode for brine electrolysis characterized by the use of the electrode catalyst according to claim 33.

37. A gas diffusion electrode for brine electrolysis comprising a gas diffusion layer and a reaction layer, said reaction layer comprises the electrode catalyst according to claim 33, wherein the electrode catalyst acts at a cathode for an oxygen reduction reaction.

* * * * *

UNITED STATES PATENT AND TRADEMARK OFFICE
CERTIFICATE OF CORRECTION

| | |
|---|---|
| PATENT NO. | : 7,566,388 B2 |
| APPLICATION NO. | : 10/538169 |
| DATED | : July 28, 2009 |
| INVENTOR(S) | : Takeaki Sasaki et al. |

It is certified that error appears in the above-identified patent and that said Letters Patent is hereby corrected as shown below:

Title Page, item [56] Column 2 (Other Publications), Line 3, change "Cehmical" to --Chemical--.

Signed and Sealed this

Twenty-seventh Day of October, 2009

David J. Kappos
*Director of the United States Patent and Trademark Office*